Sept. 13, 1932.  W. H. BEARD  1,876,592
THERMOMETER
Filed Nov. 14, 1930

FIG. 5.
FIG. 6.
FIG. 8.
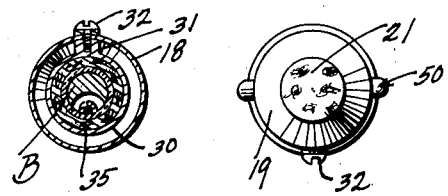
FIG. 7.
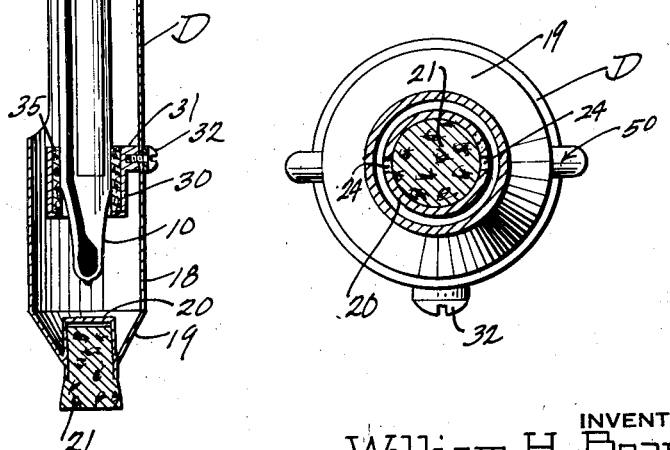
INVENTOR.
William H. Beard
BY Lancaster, Allwine and Rommel
ATTORNEYS.

Patented Sept. 13, 1932

1,876,592

UNITED STATES PATENT OFFICE

WILLIAM H. BEARD, OF BEAUMONT, TEXAS

THERMOMETER

Application filed November 14, 1930. Serial No. 495,764.

This invention relates to improvements in thermometers.

The primary object of this invention is the provision of an improved thermometer which is mounted in such protected relation that the same will not become broken as a result of rough treatment.

A further object of the invention is the provision of an improved thermometer such as is particularly well adapted for taking the temperature of liquids such as oil, and the like, at predetermined levels, in an accurate manner, and preferably under such circumstances that a sample of the liquid from the predetermined level may be removed from the body of liquid as an incident of withdrawal of the thermometer.

A further object of this invention is the provision of improved means for mounting a glass thermometer in a shock absorbing relation within a suitable protecting casing.

Other objects and advantages of this invention will be apparent during the course of the following detailed description.

In the accompanying drawing, forming a part of this specification, and wherein similar reference characters designate corresponding parts throughout the several views, Figure 1 is a front elevation of the improved thermometer.

Figures 4, 5, 6 and 7 are transverse sectional views taken substantially on their respective lines in Figure 1 of the drawing.

Figure 8 is a bottom plan view of the thermometer.

Figure 1:
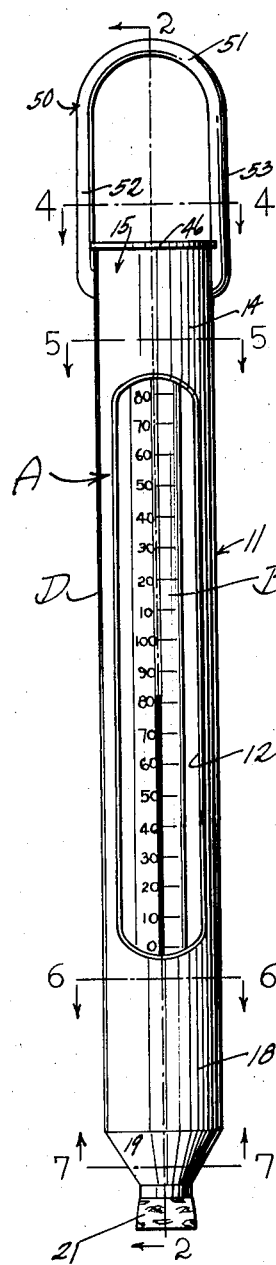

In the drawing, wherein for the purpose of illustration is shown only a preferred embodiment of the invention, the letter A may generally designate the improved thermometer, which may include the thermometer proper B mounted by shock absorbing means C in a suitable metal casing D.

The thermometer proper B is of the elongated glass tube variety, the lower end 10 of which may be reduced and provided with a suitable bulb, wherein the body of mercury or expansible liquid is received. The tube receives therein a conventional indicia bearing cylinder, so that the temperature readings will be visible at all times when the exterior of the tube is clean.

The casing D is preferably of metal, including an elongated cylindrical shaped body 11 which is longitudinally cut away at 12 to provide a sight opening through which the temperature readings of the thermometer B are visible. The upper portion 14 of the casing body 11 is cylindrical in shape and detachably receives a metallic cap 15 in a manner to be subsequently described. The lower portion 18 of the casing body 11 is cylindrical in shape, and tapers downwardly in convergent relation at 19, where it is connected with an inverted cup-shaped socket 20, which receives therein a shock absorbing cork 21 in a frictionally retained relation. The cup-shaped socket 20 is transversely perforated, as shown at 24 in the drawing, and through which the perforations the liquid entrapped in the lower cylindrical portion 18 may drain upon removal of the cork 21.

The shock absorbing means C preferably includes a support carried by the casing D in the lower cylindrical portion 18 thereof, immediately below the opening 12. This support consists of a metal sleeve 30, having a boss 31 thereon provided with a screw threaded opening therein. A detachable bolt or screw 32 is radially inserted through a suitable opening in the casing portion 18, and is threaded into the opening in the boss 31 to clamp the sleeve 30 in the position shown in Figure 2, wherein it is placed in axial alignment within the casing passageway. The metal sleeve 30 therein supports a cork, rubber, or other yieldable sleeve 35, into which the lower end of the thermometer proper B is slipped and retained.

Figure 2:
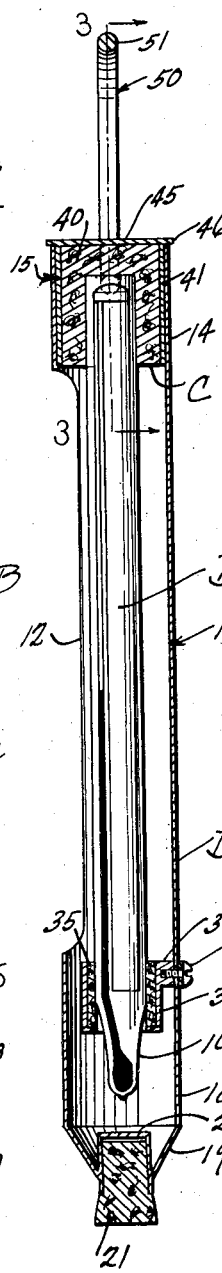
Figure 2 is a longitudinal sectional view taken substantially on the line 2—2 of Figure 1.

The shock absorbing means C furthermore includes a yieldable socket piece 40, preferably of cork or rubber, detachably seated in the cup-shaped cap 15; the same having a downwardly facing socket which frictionally receives the upper end of the thermometer proper B, as shown in Figure 2 of the drawing. The cap 15 is of that type which includes a cylindrical metal sleeve body 41 which frictionally fits within the upper cylindrical portion 14 of the casing B, and it is provided with a preferably solid metallic top 45 which is provided with an annularly projecting flange 46 extending over the top edge of the casing D and marginally therebeyond, to limit the inserted movement of the cap 15 in the upper end 14 of the metal casing D, as is quite apparent.

Figure 3:
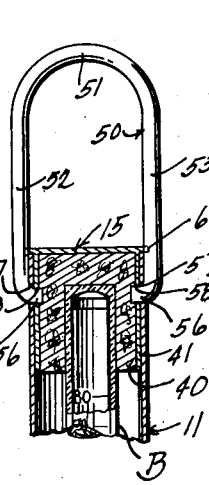
Figure 3 is a fragmentary sectional view taken substantially on the line 3—3 of Figure 2.
Figure 4:
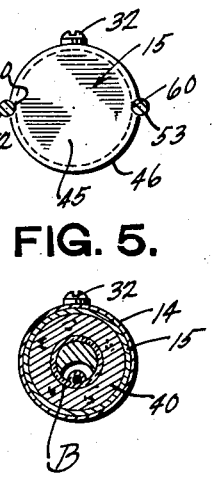

A detachable bail 50 is provided, preferably comprising a bight portion 51 and arms 52 and 53 yieldably connected therewith. These arms 52 and 53 just opposite the bight 51 are provided with inturned shanks 56 adapted to be releasably seated in suitable openings 57 provided at diametrically opposed points in the upper end 14 of the casing D, as shown in Figure 3 of the drawing. These projections 56 furthermore engage in openings 58 provided at diametrically opposed points in the cap 15, as also shown in Figure 3; it being of course understood that the openings 57 and 58 are aligned to permit this spring snapping of the ends of the bail 51 thereinto. It is quite apparent that the bail 51 when attached to the casing D and the cap 15 thereof holds the latter in position against accidental detachment. The overhanging flange 46 of the cap is furthermore notched at 60, as shown in Figure 4 of the drawing, to permit the bail arms 52 and 53 to snap therein, for the purpose of holding the bail rigid with respect to the casing, to prevent the accidental swinging or pivoting thereof upon the casing, and as an additional means for holding the cap upon the casing.

The usual mode of taking temperatures at predetermined levels in a body of liquid is to attach a line, preferably of measured length, to the bail 51, and lower the thermometer device A into the body of liquid to the desired level. It is of course apparent that the liquid will flow through the opening 12 into the casing D, and at the predetermined level a body of liquid will be trapped in the lower cylindrical portion 18 of the casing D; it being understood that the thermometer device A is permitted to remain at the predetermined level for a sufficient length of time for properly registering the temperature thereof upon the thermometer proper B. Upon prompt and proper withdrawal of the thermometer from the liquid it is quite apparent that a sample of liquid will be entrapped in the lower portion 18 of the casing D, for accurately maintaining the thermometer proper B at the temperature which it is desired to have registered. If it is desired to extract a sample of the liquid from the predetermined level the cork 21 is removed and the sample is permitted to drain through the openings 24 into a desired container.

Due to the mounting of the thermometer proper B it is quite apparent that the same is protected against possibility of breaking, even incident to exceptionally rough handling. Thus, if the operator drops the device A into a tank, it is quite apparent that the cork 21, should the thermometer hit against the bottom of the tank, or other rigid support, will prevent extreme shocks being transmitted to the thermometer proper B, inasmuch as the cork 21 protrudes considerably below the metallic portion of the casing D. Furthermore, incident to the yieldable support of the upper and lower ends of the thermometer proper B, the latter is very effectively mounted against liability of breaking.

The parts of the improved device A may be relatively disassembled. The bail 50 may obviously be removed by springing the bail arms 52 and 53 apart. Thereafter the cap 15 may be removed, and the thermometer proper B may be pulled from its yieldable cork or other support. The support comprising the sleeves 30 and 35 may be removed by means of the screw 32, as is quite apparent. Thus the device may be readily disassembled for replacement of parts, or cleansing, or for any other desired purpose.

Various changes in the shape, size, and arrangement of parts may be made to the form of invention herein shown and described, without departing from the spirit of the invention or the scope of the claims.

I claim:

1. In a thermometer the combination of an elongated metallic casing having an elongated opening therein, a breakable thermometer tube having an expansible liquid in the lower end thereof, shock absorbing means mounting the thermometer tube in the elongated casing in a readable relation through said opening of the casing, a removable cap upon the casing for preventing removal of the thermometer tube, and means to releasably hold the cap upon the casing, including a bail having resilient arms pivoted to the casing, the cap being provided with an outwardly projecting circumferential flange having diametrically opposed notches, releasably receiving portions of the bail in firm contact, said notches holding the bail rigid with respect to the casing.

2. In a thermometer the combination of an elongated metallic casing having an elongated opening therein, a breakable thermometer tube having an expansible liquid in the lower end thereof, shock absorbing means mounting the thermometer tube in the elongated casing in a readable relation through said opening of the casing, and a removable cap upon the casing for preventing removal of the thermometer tube, means to releasably lock the cap upon the casing including a bail, the casing and cap at diametrically opposed points being provided with openings for releasably receiving portions of the bail therein.

3. In a thermometer device the combination of a protecting casing having an elongated opening therein and a lower liquid receiving chamber to which liquid enters through said opening, a detachable shock absorbing drain plug in the lower end of and projecting from said casing for holding liquid in said chamber and absorbing shocks encountered by said thermometer device, a thermometer tube having an expansible liquid in the lower end thereof, and means mounting the tube in the casing in a readable relation with respect to said opening and with the expansible liquid containing end thereof in said chamber at the lower end of said casing.

4. In a thermometer device, the combination of a protecting casing having an elongated opening therein and a lower liquid receiving chamber to which liquid enters thru said opening, said chamber having an inverted cup-shaped socket opening outwardly at the lowermost end of said chamber, said socket being provided with a transverse opening in a side wall thereof communicating with said chamber, a detachable drain plug in the socket preventing liquid in said chamber from flowing out of said transverse opening, and a thermometer carried in said casing.

WILLIAM H. BEARD.